UNITED STATES PATENT OFFICE.

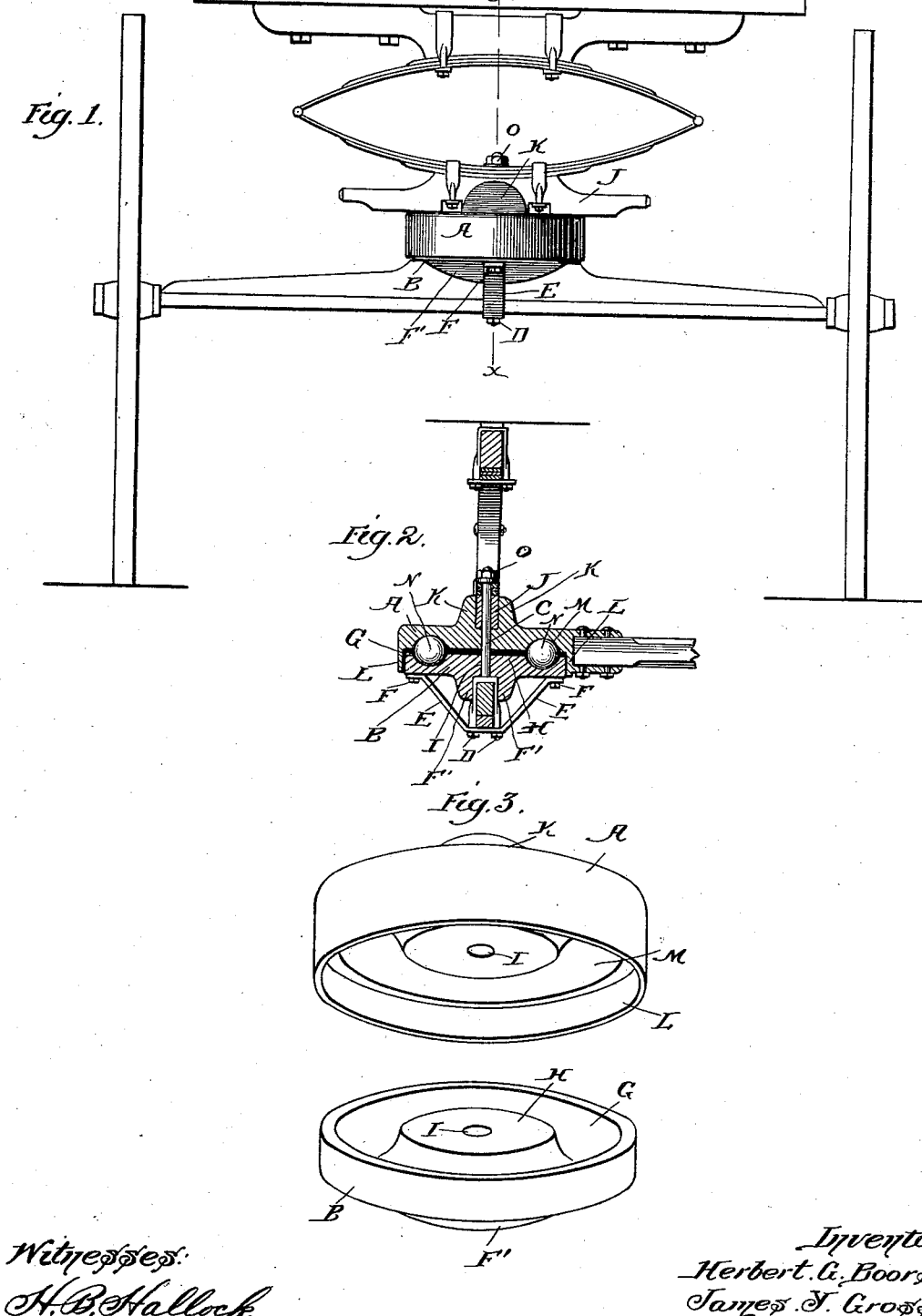

HERBERT G. BOORSE AND JAMES Y. GROSS, OF LANSDALE, PENNSYLVANIA.

FIFTH-WHEEL.

SPECIFICATION forming part of Letters Patent No. 592,232, dated October 26, 1897.

Application filed February 4, 1897. Serial No. 621,923. (No model.)

*To all whom it may concern:*

Be it known that we, HERBERT G. BOORSE and JAMES Y. GROSS, citizens of the United States, residing at Lansdale, in the county of Montgomery and State of Pennsylvania, have invented a certain new and useful Improvement in Fifth-Wheels, of which the following is a full, clear, and exact specification.

Our invention relates to a new and useful improvement in fifth-wheels for vehicles, and has for its object to so construct a device of this description as to greatly reduce the friction incident to its movements by the interposition of a series of balls between the two halves thereof.

With this end in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is an elevation of that portion of a vehicle to which the fifth-wheel is attached, showing our improvement in connection therewith; Fig. 2, a section at the line *x x* of Fig. 1; and Fig. 3, a detail perspective of the two sections of the fifth-wheel separated from each other, the balls being omitted.

In carrying out our invention as herein embodied we provide a fifth-wheel which is composed of the sections A and B, the latter being secured to the axle by means of the forked ends of the king-bolt C, which serves as a clip and is held in place by the nuts D; and as a means of holding the section B rigid relative to the axle the bracket-arms E are also secured to the axle, and in turn, by means of the bolts F, to the under side of said section. Flanges F' are formed with this section and embrace the axle and forked end of the king-bolt, thereby rendering it more rigid. The section B has an annular groove G formed therein by the elevated center H, as clearly shown, and through this raised center is formed a hole I for the passage of the king-bolt. The section A is secured to the bolster J by the passage of the king-bolt therethrough and through the bolster, and it is prevented from turning by the ribs K, formed thereon and embracing the bolster. This section serves as a cap for the section B, the flange L thereof fitted over the last-named section, so as to exclude dust or other foreign substances therefrom. An annular groove M is formed in the cap A, which corresponds to the groove G, and in these two grooves are placed the balls N, so that they will freely travel in these sections when either member of the fifth-wheel is revolved. The king-bolt is held in place by the nut O, run upon its upper threaded end, and a suitable washer may be interposed between this nut and the bolster J. From this description it will be obvious that the movements of the fifth-wheel will be almost frictionless, and the balls run in the grooves will serve to hold the fifth-wheel in its central position, so as to maintain its sections concentric with each other with but little strain upon the king-bolt, thus obviating the liability of breakage at this point and greatly increasing the durability and effectiveness of the fifth-wheel.

The cost of manufacturing a fifth-wheel in accordance with our improvement is but little, if any, in excess of the cost of manufacture of fifth-wheels of ordinary construction, while greatly enhancing their value, as they cannot become clogged or cramped, as has heretofore been the case.

Having thus fully described this invention, what is claimed as new and useful is—

In a device of the character described, a fifth-wheel composed of two sections A, and B, having annular grooves formed therein, a set of balls N, in the grooves of the sections, a king-bolt C, on which the sections are journaled and having a forked end engaging the axle, bracket-arms connecting the plate B, with the forked end of the king-bolt, flanges F' formed on the section B to embrace the axle and forked end of the king-bolt, ribs K, formed on section A, to embrace the bolster and a flange L, on the section A, to surround the section B, as described.

In testimony whereof we have hereunto affixed our signatures in the presence of two subscribing witnesses.

HERBERT G. BOORSE.
    JAMES Y. GROSS.

Witnesses:
 S. S. WILLIAMSON,
 A. D. JOHNSON.